United States Patent [19]
Schwambach et al.

[11] Patent Number: 5,958,570
[45] Date of Patent: Sep. 28, 1999

[54] LAMINATED COMPOSITE BODY, IN PARTICULAR CONVEYOR BELT

[75] Inventors: Dana Schwambach, Cologne; Hans Uwe Bender, Gruendau; Hans Joachim Koch, Bornheim, all of Germany

[73] Assignee: Contitech Transportbandsysteme GmbH, Hannover, Germany

[21] Appl. No.: 08/737,804

[22] PCT Filed: May 19, 1995

[86] PCT No.: PCT/DE95/00686

§ 371 Date: Dec. 26, 1996

§ 102(e) Date: Dec. 26, 1996

[87] PCT Pub. No.: WO95/32861

PCT Pub. Date: Dec. 7, 1995

[30] Foreign Application Priority Data

May 27, 1994 [DE] Germany ............... 44 18 590

[51] Int. Cl.⁶ .................................................. B32B 25/04
[52] U.S. Cl. .......................................................... 428/217
[58] Field of Search ............................................. 428/217

[56] References Cited

U.S. PATENT DOCUMENTS

| | | | |
|---|---|---|---|
| 2,784,130 | 3/1957 | Kaelin | 154/52.1 |
| 4,107,364 | 8/1978 | Sisson | 428/196 |
| 4,339,506 | 7/1982 | Martin | 428/519 |
| 4,411,947 | 10/1983 | Heynhold | 428/250 |
| 4,567,088 | 1/1986 | Skogman et al. | 428/213 |
| 4,734,314 | 3/1988 | Inggs | 428/174 |
| 4,863,779 | 9/1989 | Daponte | 428/152 |
| 4,981,737 | 1/1991 | Rico | 428/40 |
| 5,571,223 | 11/1996 | Dudovicz | 34/110 |
| 5,656,376 | 8/1997 | Rafferty et al. | 428/413 |

FOREIGN PATENT DOCUMENTS

| | | |
|---|---|---|
| 0 051 750 | 5/1982 | European Pat. Off. . |
| 0 142 716 | 5/1985 | European Pat. Off. . |
| 0 431 907 | 6/1991 | European Pat. Off. . |
| 0 175 410 | 1/1971 | Germany . |
| 3 342560 | 6/1985 | Germany . |
| 9 207 785 | 10/1992 | Germany . |

OTHER PUBLICATIONS

Yokohoma Rubber, Derwent Abstract for JP591254610, 1984.

Primary Examiner—Mukund J. Shah
Assistant Examiner—Deepak Rao
Attorney, Agent, or Firm—Foley & Lardner

[57] ABSTRACT

A laminated composite body, in particular a conveyor belt, consists of a carcass (2, 2', 2") that determines the mechanical stability of the laminated composite body, and at least one cover (1, 1') made of rubber, thermoplastic elastomer (TPE) and/or plastics that are highly resistant to mechanical damages such as notches, cuts, or the like. In order to improve the resistance of the laminated composite body, the cover (1) is made of at least two layers (10, 11, 12) with different properties that are interconnected so as to form a clear phase limit.

18 Claims, 2 Drawing Sheets

LAMINATED COMPOSITE BODY, IN PARTICULAR CONVEYOR BELT

This application is the national phase filing of PCT/DE95/00686, which was filed May 19, 1995.

BACKGROUND OF THE INVENTION

1. Field of the Invention

The invention relates to a laminated composite body, in particular conveyor belt, comprising a support which essentially determines a mechanical stability of the laminated composite body and at least one cover plate made of rubber, thermoplastic elastomer and/or plastics, which has a high resistance to mechanical damage in the form of notches, cuts or the like.

A particularly important example of a laminated composite body according to the invention is a conveyor belt.

2. Description of Related Art

The conveyor belt, as an essential component of belt conveying systems, essentially has to fulfill two tasks. The first task consists in transmitting a belt tensile force, in order to build up sufficient normal forces in the belt between the drive drums to be able to transmit the drive force by means of the friction on the belt. The tensile force for overcoming the kinetic resistance is taken up by the mechanical reinforcement arrangements situated in the belt. The conveyor belt furthermore has to transport material for conveying. The material for conveying is regularly thrown onto the conveyor belt, specifically from a height of up to 10 m. Since the material for conveying may also be sharp-edged rock or the like, the conveyor belt has to be configured such that the impact of the material to be conveyed on the conveyor belt does not lead to any damage to the belt. To this end, the conveyor belt is provided with a cover plate, which in particular has the function of protecting the mechanical reinforcement arrangement in the tension support layer, which serves as support, from damage, since damage of this kind impairs or destroys the operating capacity of the belt. Steel cable arrangements or arrangements of a plurality of layers of fabric are conventional for the reinforcement arrangement.

Due to continuous pelting from the particles of bulk material, the top layer of the cover plate of a conveyor belt becomes scarred during operation, sometimes forming relatively small notches. The notches or scars may become the starting point for slitting or hairline cracks, which propagate as a function of the operating conditions (belt speed, trough of the conveyor belt, spacing of the drive rollers), of the material being conveyed and of the belt properties, as a result of the continuously changing states and concentrations of stresses at the crack tip. This may result in penetration as far as the tension support layer, which places the operating capacity of the conveyor belt in doubt. In practice, therefore, a conveyor belt which is exposed to the bulk material over a relatively long period of time is replaced when the surface of the cover plate exhibits numerous scars and notches due to the continuous impact of the bulk material.

A known measure for increasing the service time consists in increasing the thickness of the cover plate. As a result, the energy required for penetration is increased. However, it is not possible to prevent notches and cuts leading to penetration through even the greater thickness of the cover plate. The effect achieved with the increased use of material is therefore limited.

A further known measure for increasing the service life consists in incorporating transverse reinforcements made of textile or metal materials. The latter have to join to the rubber well and permit the required trough properties of the conveyor belt. The aim of the transverse reinforcement is to cushion high inputs of energy from the falling material in that it absorbs forces itself, distributes the stresses and thus prevents direct penetration onto the tension support layer. Above all, it prevents those longitudinal cuts which may lead to steel cables fanning out. However, this measure does not make it possible to exclude the risk of notches and cuts being formed.

It is furthermore known, in order to increase the service life of belt cover plates, to introduce fibers into the cover plate material. In order that differing properties of the cover plate in the longitudinal and transverse directions should not arise, the distribution of the fibers has to be unoriented. However, conventional processing (calendering) of the cover plate produces a preferred alignment of the fibers, which does not make it possible to construct a closed fiber network. Therefore, the introduction of fibers into the cover plate is also only of limited use.

Another example of a laminated composite body mentioned at the outset is a roller having a cover layer applied on a metallic core, which cover layer is exposed to similar stresses, from granular and sharp-edged material being rolled, to the cover layer of a conveyor belt.

A laminated composite body of the type mentioned at the outset, designed as a conveyor belt, is disclosed by DE-A 17 50 410. In this case, a plurality of layers taking up the tension are provided, the cover plates which close off the layers taking up the tension to the outside being of single-layer construction.

EP 0 431 907 A2 discloses a roller coated with rubber, on the metal core of which are applied two rubber layers, the two rubber layers being formed from essentially the same base material and the outer rubber layer merely having an additive increasing the abrasion resistance, for example in the form of a zinc salt.

A multilayer waterproof sheeting for roofs is known from DE 33 42 560 A1, in which sheeting an EPDM rubber, which is per se advantageous, is provided with a glass fiber reinforcement, but on the outside is covered by an SEBS rubber layer which enhances the usual laying of the waterproof sheeting for roofs. The multilayer structure therefore stems from the usual laying technology for waterproof sheeting for roofs and is not intended to increase the resistance to mechanical damage in the form of notches, cuts or the like.

The same applies to the erosion-resistant and corrosion-resistant protective coating which is disclosed in DE 92 07 785 U1. The latter has an outer antiwear layer having a Shore A hardness of 45 to 75, a soft rubber layer beneath this having a Shore A hardness of 45 to 55, a supporting layer and a fourth layer made of soft rubber having a Shore A hardness of 45 to 75. The supporting layer consists of a layer of steel, a layer of fabric or a layer of hard rubber having a Shore D hardness of about 70 to 80. The corresponding coating is intended to have a high resistance to chemically aggressive materials, which permit [sic] use in flue-gas desulfurization plants. Increasing the resistance to mechanical damage in the form of notches, cuts or the like was neither the desired object nor disclosed.

SUMMARY OF THE INVENTION

The object on which the invention is based consists in improving the cover plate of a laminated composite body of the type mentioned at the outset such that higher service times with respect to mechanical damage in the form of notches, cuts or the like become possible.

In order to solve this problem, the laminated composite body of the type mentioned at the outset is characterized according to the invention in that the cover plate is formed from at least two layers which have different properties, are joined to one another and form between them a clear phase boundary which impedes the propagation of cracks, by the fact that the outer first layer of the cover plate has a hardness which is at least 10% higher than a second layer, which adjoins the first cover layer on the inside, of the cover plate, the first layer having a Shore A hardness of between 50 and 80 and the second layer having a Shore A hardness of between 35 and 60, and the second layer, which adjoins the first layer, having an elasticity which is greater than 55% and at least 10% higher than the first layer.

Figure 1:
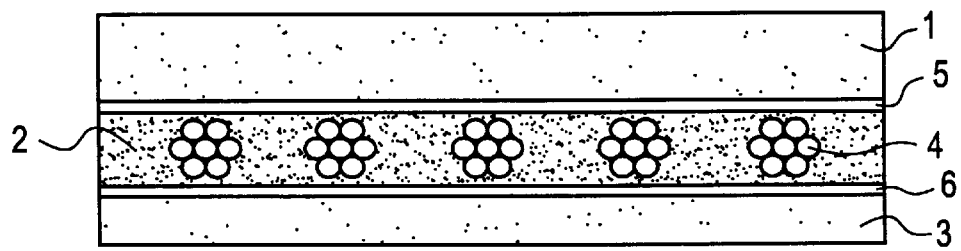
FIG. 1 shows a section through a steel cable conveyor belt.

According to FIG. 1, a steel cable belt comprises an outer layer 2 and a runningside cover plate 3.

DETAILED DESCRIPTION OF PREFERRED EMBODIMENTS

The cover plate, which provides the protective function, of the laminated composite body according to the invention is of multilayer design, a clear phase boundary in the composite resulting from the formation of the plurality of layers having the differing hardness and elasticity properties. As a result, when a crack is formed in the outer layer of the cover plate, the propagation of the crack is stopped, or at least inhibited, at the phase boundary. The multilayer design having the layers formed according to the invention therefore makes it possible to achieve a significantly improved protective function using the cover plate, for the same thickness of the cover plate.

In a preferred embodiment, the cover plate comprises three layers having two clear phase boundaries.

The material of the cover plate is preferably—as before—a rubber material based on natural and/or synthetic rubbers.

The first, outer layer of the cover plate preferably forms at least 30% of the thickness of the cover plate, if the overall thickness of the cover plate is, for example, 15 to 20 mm. If the overall thickness is significantly less, the outer layer should form a greater relative thickness of up to 50%. The first layer is expediently designed to have the greatest hardness and serves as an "armored layer".

The second layer is preferably designed to be more elastic than the first layer, in order to be able to absorb energy introduced via a crack tip or a notch elastically, i.e. without destruction of material.

The Shore A hardness of the first layer should preferably be 65 to 72 and the Shore A hardness of the second layer should preferably be 50 and [sic] 57.

The first and the second layers should have a strength of greater than 20 MPa and preferably greater than 25 MPa and an elongation of greater than 400%, preferably greater than 500%.

An important parameter for the first layer is a high abrasion resistance. The abrasion—measured in accordance with DIN—should be less than 120 mm$^3$, preferably less than 100 mm$^3$.

The elasticity which is essential for the second layer should preferably be greater than 60%.

The introduction and propagation of cracks in the cover plate can be reduced by filling at least the first layer with active filler, e.g. carbon black or silica.

The first layer is preferably formed with a system crosslinked with little or no sulfur.

The differences producing the phase boundary between the first and the second layers may also include crosslinking with different systems.

Preferably, an inner third layer is present, which adjoins the second layer on the inside and has a Shore A hardness of 55 to 70, preferably a Shore A hardness of 60 to 65, which value is between the hardnesses of the first and the second layers.

The invention is explained in more detail below with reference to exemplary embodiments depicted in the drawings.

The informer [sic] layer 3 has twisted steel cables 4 as mechanical reinforcement arrangement, which cables are embedded in a rubber material forming the tension support layer 2.

Transverse reinforcements 5, 6 may be introduced between the tension support layer 2 and the cover plates 1, 3.

Figure 2:
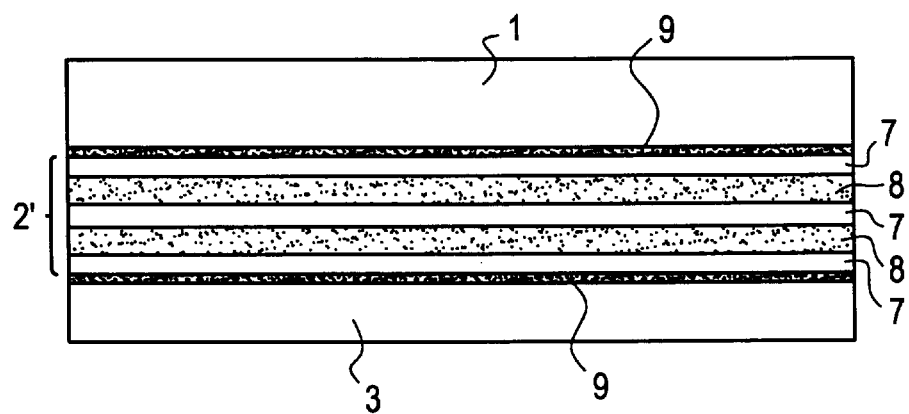
FIG. 2 shows a section through a multilayer rubber conveyor belt.

FIG. 2 shows a tension support layer 2', the mechanical reinforcement arrangement of which comprises three layers 7 of fabric. Binder layers 8 made of a rubber material based on natural or synthetic rubber are situated between the layers of fabric. Joining to the cover plates 1, 3 is effected by adhesive layers 9 applied to the respectively adjacent layers 7 of fabric.

Figure 3:
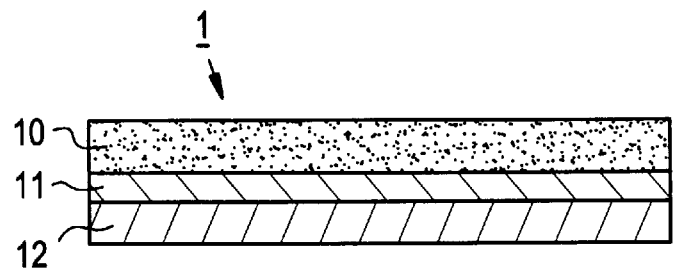
FIG. 3 shows a section through a cover plate structure having three layers.

FIG. 3 illustrates that according to the invention the cover plates 1 comprise a plurality of layers. In the exemplary embodiment depicted in FIG. 3, a highly elastic second layer 11 and a third layer 12, which if desired may be provided with a transverse reinforcement as protective layer, adjoins [sic] an outer first layer 10, which provides the function of an armored layer.

All three layers 10, 11, 12 are formed from rubber materials or thermoplastic elastomers. The first layer 10 has the greatest hardness, the second layer 11 the lowest hardness but the highest elasticity and the third layer 12 a medium hardness.

Clear phase boundaries, which at least inhibit propagation of cracks, are formed between the layers 10, 11, 12.

Figure 4:
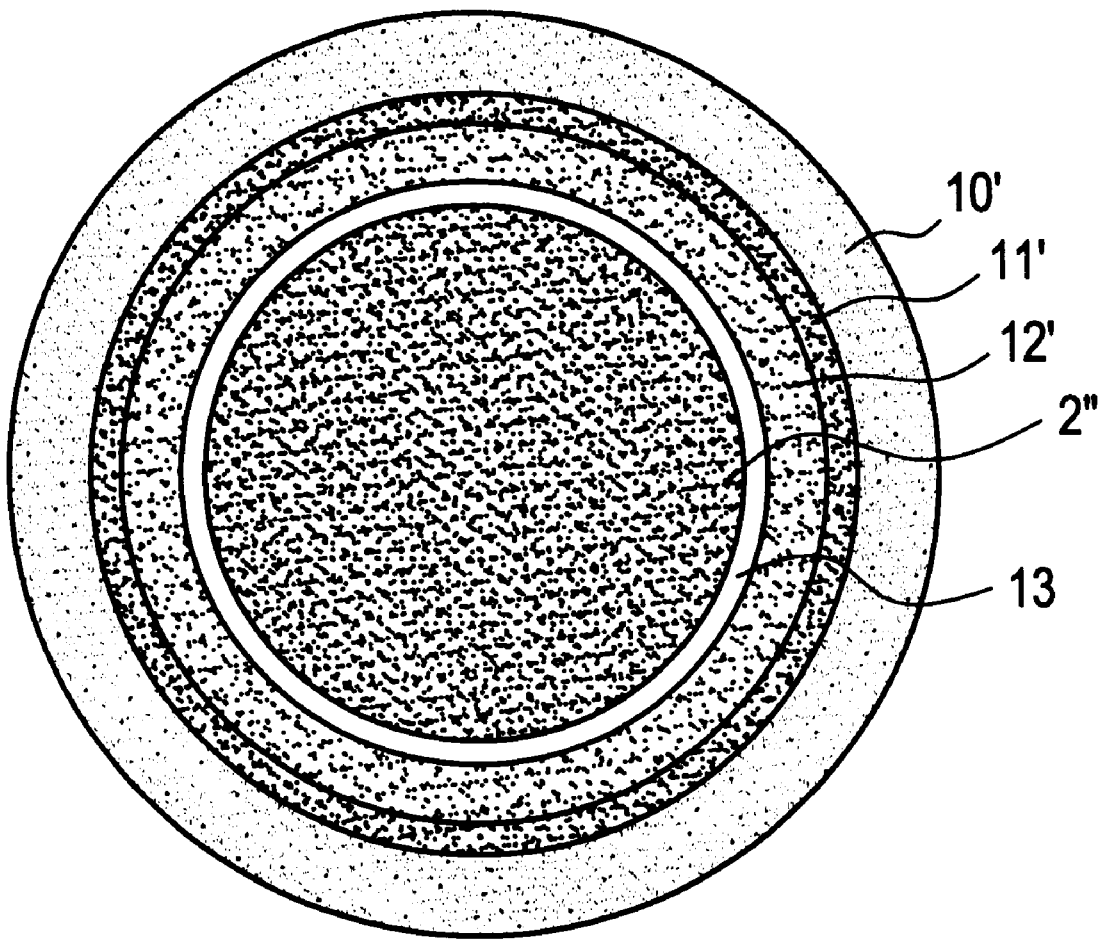
FIG. 4 shows a section through a roller structure.

As a further example of the use of a laminated composite body according to the invention, FIG. 4 shows a roller comprising a metal core as support 2", on which are applied, over a binder layer 13, from the inside to the outside a third layer 12', a second layer 11' and a first, outer layer 10', which have the same features as the layers 10, 11, 12 of the conveyor belts described above.

We claim:

1. A laminated composite body comprising:
   a support for providing mechanical stability; and
   at least one cover plate having a multi-layer design which comprises a material which exhibits high resistance to mechanical damage and is selected from the group consisting of rubbers, thermoplastic elastomers, plastics, and mixtures thereof, wherein said cover plate comprises at least two layers which exhibit different properties and are joined to one another thereby forming a phase boundary between the layers for impeding the propagation of cracks and wherein the at least two layers comprise an outer first layer and a second layer, and wherein the outer first layer has a Shore A hardness of between 50 and 80 and the second layer has a Shore A hardness of between 35 and 60 wherein the hardness of the outer first layer is at least 10% higher than the hardness of the second layer, and the second layer has an elasticity of at least 55%, the elasticity of the second layer being at least 10% higher than the elasticity of the outer first layer.

2. The laminated composite body according to claim 1, wherein the cover plate comprises three layers having two clear phase boundaries.

3. The laminated composite body according to claim 1, wherein the outer first layer of the cover plate forms 30 to 50% of the thickness of the cover plate.

4. The laminated composite body according to claim 1, wherein the Shore A hardness of the outer first layer is between 65 and 72.

5. The laminated composite body according to claim 1, wherein the Shore-A hardness of the second layer is between 50 and 57.

6. The laminated composite body according to claim 1, wherein the first and the second layers have a strength of greater than 20 Mpa and an elongation of greater than 400%.

7. The laminated composite body according to claim 6, wherein the first and the second layers have a strength of greater than 25 Mpa and an elongation of greater than 500%.

8. The laminated composite body according to claim 1, wherein the outer first layer has an abrasion of less than 120 $mm^3$.

9. The laminated composite body according to claim 8, wherein the outer first layer has an abrasion of less than 100 $mm^3$.

10. The laminated composite body according to claim 1, wherein the second layer has an elasticity of greater than 60%.

11. The laminated composite body according to claim 1, wherein the first and the second layers comprise a rubber material based on natural and/or synthetic rubber.

12. The laminated composite body according to claim 1, wherein at least the first layer is filled with an active filler.

13. The laminated composite body according to claim 1, wherein the first layer is formed from a material crosslinked with little or no sulfur.

14. The laminated composite body according to claim 1, wherein the first layer and the second layer comprise different crosslinked materials.

15. The laminated composite body according to claim 1, wherein a third layer adjoins the second layer on the inside and has a Shore A hardness of 55 to 70.

16. The laminated composite body according to claim 15, wherein the Shore A hardness of the third layer is between 60 and 65.

17. The laminated composite body according to claim 15, wherein the third layer has a high resistance to tear propagation.

18. The laminated composite body according to claim 1, further comprising a transverse reinforcement in the third layer.

* * * * *